United States Patent [19]
Edwards

[11] 3,925,756
[45] Dec. 9, 1975

[54] VEHICLE FUEL LOSS ALARM

[76] Inventor: Joseph Edwards, Rte. 1, Ludingtonville Road, Holmes, N.Y. 12531

[22] Filed: Aug. 16, 1974

[21] Appl. No.: 498,190

Related U.S. Application Data

[63] Continuation-in-part of Ser. No. 490,560, July 22, 1974, abandoned.

[52] U.S. Cl. ............... 340/59; 340/63; 307/10 AT; 180/114
[51] Int. Cl.² ........................................ B60R 25/10
[58] Field of Search ....... 340/59, 63, 64, 65, 244 R; 307/10 R, 10 AT; 180/114

[56] References Cited
UNITED STATES PATENTS
3,634,699  1/1972  Cox............................ 340/244 R X Primary Examiner—Alvin H. Waring

[57] ABSTRACT

An alarm circuit is provided for use in a vehicle having a power source, a fuel supply and means for sensing the level of fuel in the supply and for generating a signal in accordance therewith. The circuit includes an alarm and signal storage means connected to the fuel level sensing means for storing the signal generated by the fuel level sensing means. Signal comparison means are connected to the storage means and to the fuel level sensing means for generating an actuation signal when the signal from the fuel level sensing means is different from the stored signal. Means for energizing the alarm upon receipt of the actuation signal are also provided. The circuit energizes the alarm if the fuel supply is reduced either by siphoning, punching a hole in the supply tank or unauthorized use of the vehicle. In addition, the ignition circuit may be connected to the alarm circuit such that a change in the fuel supply level due to movement of the vehicle will result in deactivation of the ignition circuit thereby preventing theft of the vehicle.

14 Claims, 2 Drawing Figures

VEHICLE FUEL LOSS ALARM

This application is a continuation-in-part of my copending application Ser. No. 490,560 filed July 22, 1974, and now abandoned.

The present invention relates to alarm circuits for use on vehicles and more particularly to an alarm circuit for use on a vehicle which detects the loss of fuel from the supply tank of the vehicle.

The recent and widespread shortage of gasoline for use in motor vehicles has caused a sudden increase in the pilferage of gasoline from unattended vehicles. This criminal activity has risen to such proportions that large segments of the population have purchased and are utilizing gas tank caps which are lockable and therefore can be removed only by means of the appropriate key. This has been the first line of defense against that segment of the population which has purchased and are using siphoning hoses to obtain gasoline illegally.

However, the use of lockable gasoline tank caps is extremely inconvenient in that the vehicle operator must carry the key with him at all times such that the gasoline tank cap may be removed in the event that gasoline is purchased. In addition, the removal of a locked gasoline tank cap requires the vehicle operator to get out of his vehicle to remove the cap because it cannot be removed by the station attendant without the use of the key. In inclement weather this can be a great drawback. Further, since the gasoline tank cap and the portions of the vehicle immediately surrounding the gas tank inlet pipe are often covered with a greasy residue, the removal of the gas tank cap may require the soiling of the hands of the motor vehicle operator as well as perhaps his clothing.

A more serious problem is that of grand larceny by auto theft. Auto theft is widespread throughout the country and every year costs the citizens of this country substantial amounts of money in property damage, not only to the stolen vehicles, but to other property damaged by the indiscriminate use of the stolen vehicles. Further, many bodily injuries and deaths are a direct result of stolen automobiles.

It is, therefore, a prime object of the present invention to provide a fuel loss alarm which will produce an audible and/or visible signal in the event of pilferage of fuel from a fuel supply tank in a vehicle.

It is another object of the present invention to provide a fuel loss alarm which can prevent theft by causing deactivation of the ignition circuit when the vehicle is used in an unauthorized manner.

It is a further object of the present invention to provide a fuel loss alarm which is composed of simple and relatively inexpensive parts which cooperate in a reliable manner and can be installed in the motor vehicle quickly and inexpensively.

In accordance with the present invention, a fuel loss alarm circuit is provided for use in a vehicle having a power source, a fuel supply and means for sensing the level of fuel in the fuel supply and for generating a signal in accordance therewith. The circuit includes an alarm and a signal storage means operatively connected to the fuel level sensing means for storing the signal generated by the fuel level sensing means. Signal comparison means are operably connected to the storage means and the fuel level sensing means for generating an actuation signal when the signal from the fuel level sensing means is different from the stored signal. Means for energizing the alarm upon receipt of the actuation signal are also provided.

Preferably, the alarm comprises a vehicle horn, or the vehicle headlights or both. Thus, a change in the fuel level in the fuel supply tank due to pilferage of the fuel or puncture of the tank causes an audible and/or a visible alarm. Of course, a separate siren could be provided for use instead of or in conjunction with the vehicle horn. In addition, if desired, special lights could be provided in the vehicle for use instead of or in conjunction with the headlights of the vehicle.

The alarm energizing means can also be operatively connected to the ignition circuit of the vehicle. In this instance, unauthorized use of the vehicle will cause the fuel level in the fuel supply tank to change because of the motion of the vehicle thus deactivating the ignition circuit thereby causing the vehicle to cease to function and preventing the theft thereof.

The fuel loss alarm of the present invention is comprised of simple and inexpensive parts which cooperate in a reliable manner. The alarm can be installed in the vehicle in a convenient and inexpensive manner thereby making the present invention available to the average motor vehicle operator.

To the accomplishment of the above and to such other objects as may hereinafter appear, the present invention relates to a fuel loss alarm as defined in the appended claims and as described in the specification, taken together with the accompanying drawings in which:

Figure 1:
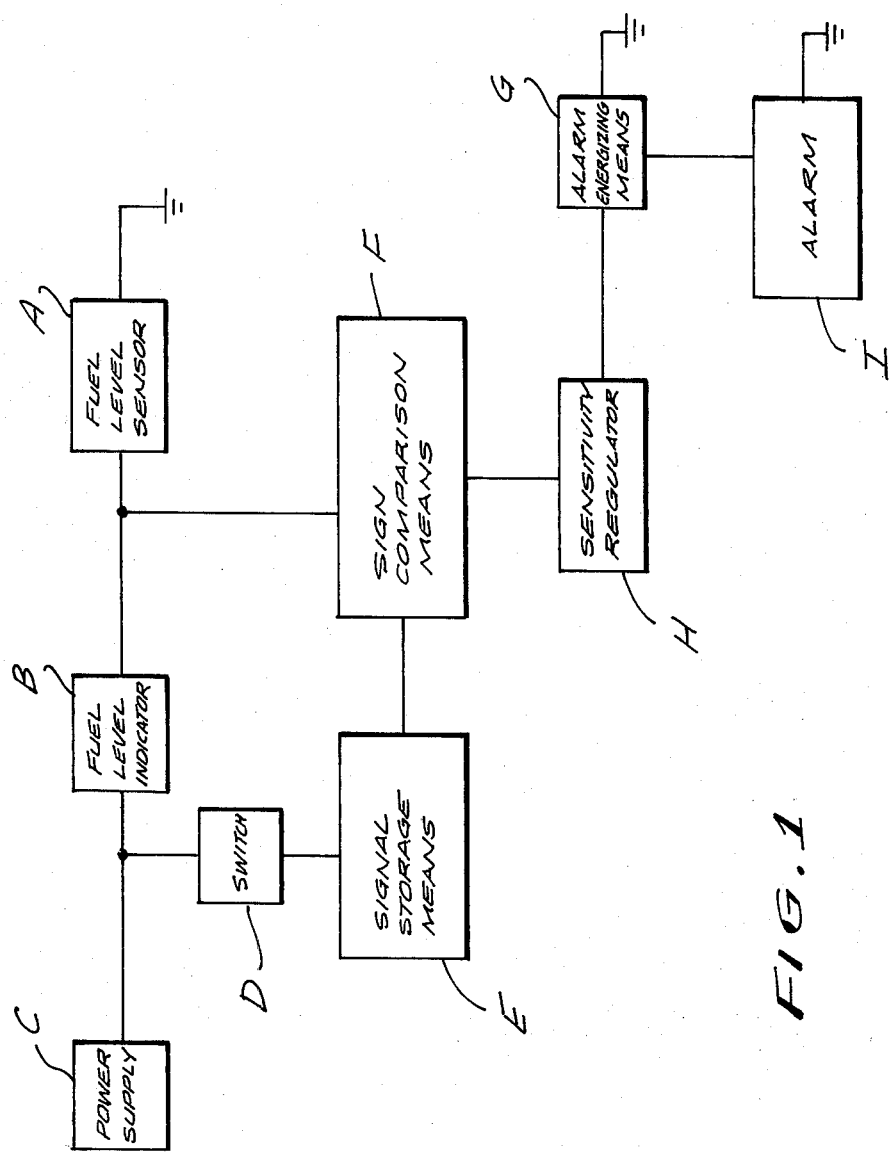
FIG. 1 is a block diagram of the circuit of the present invention.

As shown in FIG. 1, the standard automobile fuel indicating circuit is modified during the installation of the alarm circuit of the present invention by the removal of the ignition switch therefrom. Thus, the automobile fuel indicating circuit is connected directly to the vehicle power supply such that the circuit is energized whether or not the motor vehicle is operative. As seen in this FIGURE, the automobile fuel indicating circuit comprises a means, generally designated A, for sensing the level of fuel in the vehicle fuel supply. A fuel indicator or gauge, generally designated B, is connected in series with means A between the positive terminal of the vehicle power supply, generally designated C, and ground. Means A controls the amount of current flowing in the automobile fuel indicating circuit as it comprises a variable resistance which is varied in accordance with the level of fuel in the vehicle fuel supply. Thus, the amount of current flowing in the automobile fuel indicating circuit varies in accordance with the amount of fuel in the fuel supply.

A switch, generally designated D, is interposed between the fuel indicating circuit and a signal storage means, generally designated E. Switch D may be a simple toggle switch or a key operated switch. Switch D may be located in any convenient place on the interior or exterior of the vehicle, as desired. Alternatively, switch D may be the ignition switch of the vehicle which, when turned to the "off" or "accessory" position causes the storage means E to be disconnected from the automobile fuel indicating circuit thereby arming the alarm.

Signal comparison means, generally designated F, is connected to both the automobile fuel indicating circuit and storage means E. Storage means E is disconnected from the automobile fuel indicating circuit by means of switch D in order to arm the alarm. The signal stored on storage means E is representative of the fuel level at the time the alarm is armed. Comparison circuit F continually senses the signal on storage means E and compares it to the signal received from the automobile fuel indicating circuit. When these signals differ by a given amount, signal comparison means F generates an actuation signal to an alarm energizing means, generally designated G, which is preferably in the form of a relay. Interposed between signal comparison means F and relay G is a means, generally designated H, which regulates the sensitivity of the circuit, thus determining the amount of difference between the signal from storage means E and the signal from the fuel indicating circuit necessary to activate alarm energizing means G. It should be appreciated, that when switch D is positioned such that storage means E is connected to the automobile fuel indicating circuit, the inputs of signal comparison means F are identical and therefore alarm energizing means G cannot be actuated. This normally occurs when switch D, if it is not the ignition switch, is in the "off" position and when switch D, if it is the ignition switch, is in the "on" position.

Alarm energizing means G is connected to the alarm, generally designated I. Alarm I may be the horn of the vehicle, a siren or other audible alarm specially installed in the vehicle for this purpose, or the vehicle headlights or other visible indicating means provided for this purpose. In addition, alarm I may also be connected to the ignition circuit of the vehicle. In this case, the actuation of alarm energizing means G may be utilized to short out the ignition coil of the vehicle such that the ignition circuit will be deactivated in the presence of the actuation signal generated by the signal comparison means F. This will prevent unauthorized use of the vehicle as motion of the vehicle will cause the fuel level to change slightly because of the inertia of the fuel in the supply tank. This change in fuel level is detected by the alarm circuit such that the ignition circuit of the vehicle is deactuated thereby preventing the vehicle from being driven any substantial distance.

Figure 2:
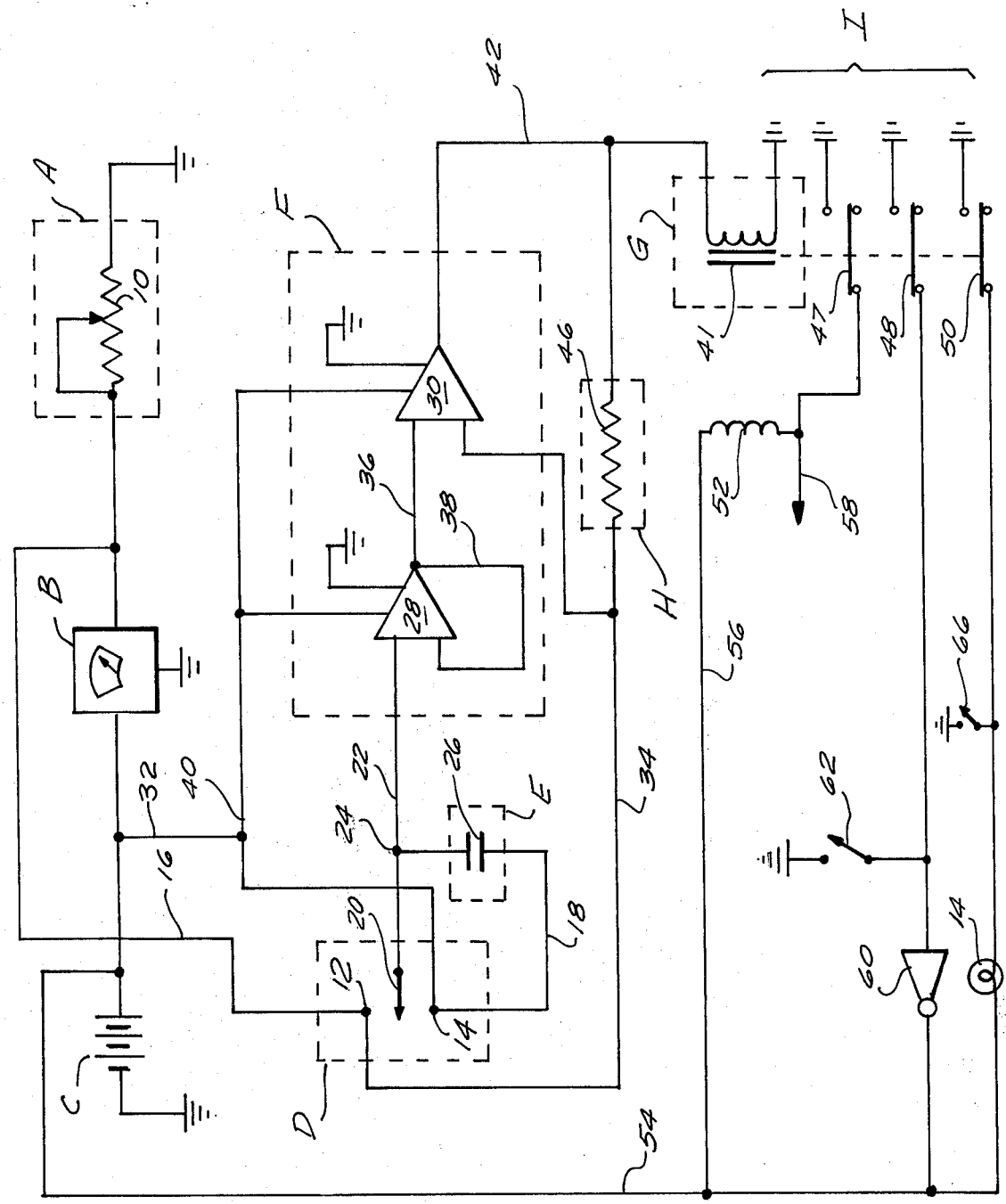
FIG. 2 is a schematic diagram of the circuit of the present invention.

As shown in FIG. 2, the vehicle fuel indicator circuit consists of a fuel level sensing means A, a fuel gauge or indicator B, and the vehicle power source C. The fuel level sensing means A is connected in series between power supply C and ground with the fuel gauge B interposed therebetween. The ignition switch, which normally would be placed in series with this circuit, has been eliminated therefrom such that the alarm circuit of the present invention can be utilized when the vehicle is not operative. The fuel level sensing means A is of the conventional type which utilizes a fuel level detector such as a float to detect the level of fuel in the vehicle fuel supply tank. This detector is connected to vary the resistance of a resistor 10. Varying the resistance of resistor 10 controls the current flowing in the fuel indicator circuit and thus the position of the indicator needle of gas gauge B, which is also of conventional construction. The power supply C which powers the vehicle is normally a 12 volt DC battery but the circuit of the present invention can be used in conjunction with batteries of other voltages, for instance 6 volts, with the appropriate alterations in the value of the components in the remainder of the system.

Switch D may be a toggle switch of the single pole, double throw variety or a key activated switch, as desired. Switch D has a contact 12 which is connected to the vehicle fuel indicator circuit by means of a line 16, and a contact 14 is connected to storage means E through a line 18. Contact 20 of switch D is connected to a line 22 which forms one of the inputs to signal comparison means F. Storage means E is also connected to line 22 through a node 24. Storage means E preferably comprises a capacitor 26 which is of the low leakage, high-value variety preferably rated from 30 to 100 $\pi$fd, one side of which is connected to line 18 and the other side of which is connected to node 24.

Switch D is designed such that when contact 20 is connected to contact 12, capacitor 26 will charge to the voltage on line 16 which is determined by the fuel level in the fuel tank. Thus, the voltage across capacitor 26 will be representative of the amount of fuel in the fuel tank. When the alarm is armed, switch D will be moved to its intermediate position such that contact 20 is isolated thereby isolating capacitor 26 from the fuel indication circuit. Capacitor 26 will maintain the charge thereon for a period of about thirty-two hours.

Signal comparison means F preferably comprises an integrated circuit containing two operational amplifiers, 28 and 30. One input of operational amplifier 28 is connected to capacitor 26 by means of line 22. One input of each of the operational amplifiers 28 and 30 is connected to the power supply C by means of a line 32. In addition, one input of operational amplifier 30 is connected to contact 12 by means of line 34. The output of operational amplifier 28 is connected to one of the inputs of operational amplifier 30 by means of a line 36. A line 38 is provided which connects the output of operational amplifier 28 to one of the inputs of operational amplifier thereof. In addition, the necessary ground connections for both operational amplifiers are provided. Thus, when contact 20 is connected to contact 12, one input of amplifier 28 is connected to line 16 by means of line 22, and one input of amplifier 30 is connected to line 16 by line 34.

The circuit for signal comparison means F is a standard circuit well known to those in the art and therefore is shown herein only semi-schematically. In addition, since this circuit is commercially available, a detailed description of the workings thereof is not included herein. The circuit is an internally compensated, high performance monolithic dual operational amplifier linear integrated circuit and is commercially available from a number of sources, one of which is the Signetics Company which designates this circuit as No. 5558. While this particular circuit has proven satisfactory, other comparable circuits may perform equally well in this application.

The underlying principle of the operation of this circuit is the maintenance of a balance between the operational amplifiers 28 and 30. As long as operational amplifiers 28 and 30 are balanced, no output is generated by the circuit. However, if the operational amplifiers become imbalanced, then an output, in the form of an actuation signal, will be generated by amplifier 30. Thus, as long as the signal from capacitor 26 is equal to the signal on line 16, which is connected to the fuel level sensing means A, no actuation signal will be generated by signal comparison means F. However, when the signal from capacitor 26 differs from the signal on line 16, operational amplifiers 28 and 30 will be imbalanced, and the actuation signal will be generated. The signal from capacitor 26 represents a reference value determined by the amount of fuel in the fuel supply at the time the alarm is armed. The signal on lines 16 and 34 represents the actual amount of fuel in the fuel supply. Should the fuel in the fuel supply be changed in any manner, such as siphoning from the fuel supply, punching a hole in the fuel supply, or movement of the car, this will cause an imbalance between operational amplifiers 28 and 30 thereby causing the generation of the activation signal. When the alarm is not in use, contact 20 of switch D is connected to contact 12 so that the inputs of amplifiers 28 and 30 are both connected to line 16 thereby preventing an imbalance between the amplifiers. In order to arm the alarm, switch contact 20 is moved to the intermediate position thus disconnecting capacitor 26 from line 16. At this point the charge on capacitor 26 represents the fuel level at the time the alarm was armed. A change in the fuel level when the alarm is armed will cause an imbalance between the amplifiers 28 and 30 thus setting off the alarm. In order to disarm the circuit, the switch is momentarily positioned such that contact 20 is connected to contact 14. In this position capacitor 26 is discharged, and during discharge line 22 is connected to line 32 by means of a line 40. Thus, during disarming, a change in the fuel level will effect both operational amplifiers simultaneously thereby preventing an imbalance between the operational amplifiers and thus the generation of the actuation signal.

A resistor 46 is connected between the output and one of the inputs of operational amplifier 30 to control the sensitivity of the signal comparison means F. The value of resistance 46 will be determined depending upon the desired sensitivity of the alarm. In addition, resistor 46 can be a variable resistor such that the sensitivity of the alarm may be changed if desired.

The actuation signal appears on a line 42 which is connected between the output of amplifier 30 and the alarm energization means G, which preferably comprises a relay 44. Relay 44 is of the conventional type and may be connected to deactivate the ignition coil, energize the horn or other audible alarm, or energize the headlights or other visible alarm, or any combination thereof. Relay 44 is shown in FIG. 2 as performing each of these functions simultaneously. However, it should be appreciated that by simple modification of the circuit shown, relay 44 can be designed to control any one of these functions individually or in combination. Relay 44 is shown as closing switches 47, 48 and 50 upon the receipt of the actuation signal. One contact of switch 47 is connected to the side of ignition coil 52 of the vehicle which is connected to the distributor head (not shown) of the vehicle by means of a line 58. The other side of ignition coil 52 is connected to a line 54 by means of a line 56. Line 54 is connected to the positive terminal of power supply C. The other contact of switch 47 is connected to ground. Therefore, upon the receipt of the actuation signal, relay 44 will close switch 47 thus grounding out ignition coil 52 thereby shutting off the vehicle.

One contact of switch 48 is connected to the horn circuit of the vehicle which comprises a horn 60 and a horn switch 62 normally located on the steering wheel of the vehicle. Switch 48 is connected in series with horn 60 between ground and line 54. Switch 62 is connected in parallel with switch 48 such that the closing of either switch 48 or switch 62 will cause the horn to sound. In a similar manner, switch 50 is connected in series with headlights 64 between line 54 and ground. The conventional headlight switch 66 is connected in parallel with switch 50 such that the closing of either switch 50 or switch 66 will energize the headlights 64. In the circuit shown in FIG. 2, the energization of relay 44 by the actuation signal causes the ignition coil 52 to be shorted out, the horn 60 to sound, and the headlights 64 to light. In this manner, an audible and visible alarm is achieved in the event that fuel is siphoned from the fuel supply or the fuel supply has been punctured.

In addition, in order to prevent unauthorized use of the vehicle, the ignition circuit can be shorted out thereby preventing the vehicle from being stolen. The theft prevention feature of the present invention can be utilized only when switch D is not the ignition switch. If it were the ignition switch, turning the switch to the "on" position would disarm the alarm. Thus, the alarm is connected to short the ignition coil only when a separate switch is provided. In this instance, if the vehicle is started when the alarm is armed, the motion of the vehicle will invariably cause a change in the level of fuel in the fuel supply tank because of the inertia of the liquid fuel. The level of the fuel moves up and down for a brief period after motion of the vehicle is initiated. The sensitivity of the alarm circuit may be set to detect this change in fuel level and actuate relay 44 to sound the alarm as well as to deactivate the ignition circuit such that the vehicle motor is caused to shut off. Thus, theft of the vehicle is prevented.

The present invention, therefore, is a relatively simple and inexpensive alarm circuit which can be installed in a vehicle relatively quickly and inexpensively. It may utilize as the audible and/or visible signal source, portions of the vehicle which are standard equipment such as the horn or headlights. It is comprised of conventional and inexpensive parts which cooperate in a reliable manner to achieve the intended function. The alarm provides an audible and visible signal upon the loss or fuel in the vehicle fuel supply such as by siphoning or by puncture of the fuel tank. In addition, the alarm prevents the unauthorized use of the vehicle by deactivating the ignition circuit when the vehicle is in motion.

While but a single embodiment of the present invention has been described herein for purposes of illustration, it should be appreciated that many variations and modifications can be made thereto. It is intended to cover all of these variations and modifications which fall within the scope of the present invention as defined by the following claims.

I claim:

1. An alarm circuit for use in a vehicle having a power source, a fuel supply and means for sensing the level of fuel in said supply and for generating a signal in accordance therewith, said circuit comprising an alarm, signal storage means operatively connected to the fuel level sensing means for storing the signal generated by the fuel level sensing means, signal comparison means operatively connected to said storage means and to the fuel level sensing means for generating an actuation signal when said signal from said fuel level sensing means is different from said stored signal and means for energizing the alarm upon receipt of said actuation signal.

2. The circuit of claim 1 wherein said vehicle has a horn and said alarm comprises the horn.

3. The circuit of claim 1 wherein said vehicle has an ignition circuit and wherein said circuit further comprises means for deactivating the ignition circuit during the presence of the actuation signal.

4. The circuit of claim 3 wherein said vehicle has lights and further comprising means for energizing the lights during the presence of said actuation signal.

5. The circuit of claim 1 wherein said vehicle has lights and further comprising means for energizing the lights during the presence of said actuation signal.

6. The circuit of claim 1 wherein said storage means comprises a capacitor.

7. The circuit of claim 1 wherein said capacitor is of the high valve, low leakage variety.

8. The circuit of claim 1 wherein said signal comparison means comprises dual operational amplifiers.

9. The circuit of claim 8 wherein the input of one of said amplifiers is connected to said storage means and the input of the other of said dual amplifiers is connected to said fuel level sensing means.

10. The circuit of claim 6 wherein said signal comparison means comprises dual operational amplifiers.

11. The circuit of claim 10 wherein the input of one of said amplifiers is connected to said storage means and the input of the other of said dual amplifiers is connected to said fuel level sensing means.

12. The circuit of claim 7 wherein said signal comparison means comprises dual operational amplifiers.

13. The circuit of claim 12 wherein the input of one of said amplifiers is connected to said storage means and the input of the other of said dual amplifiers is connected to said fuel level sensing means.

14. The circuit of claim 1 further comprising means for controlling the sensitivity of the circuit.

* * * * *